(12) United States Patent
Stirn et al.

(10) Patent No.: US 6,419,861 B1
(45) Date of Patent: Jul. 16, 2002

(54) METHOD AND APPARATUS FOR SETTING DIE HEIGHT

(75) Inventors: Andrew Keith Stirn, West Harrison, IN (US); James E. O'Bryan, Cincinnati, OH (US)

(73) Assignee: Uniloy Milacron USA Inc., Manchester, MI (US)

( * ) Notice: Subject to any disclaimer, the term of this patent is extended or adjusted under 35 U.S.C. 154(b) by 0 days.

(21) Appl. No.: 09/437,133

(22) Filed: Nov. 10, 1999

(51) Int. Cl.[7] .......................... B29C 45/64; B29C 45/80
(52) U.S. Cl. ................... 264/40.5; 264/328.1; 425/150; 425/593
(58) Field of Search .............................. 264/40.1, 40.5, 264/328.1; 425/150, 149, 589, 592, 593, 450.1, 451.5, 451.6

(56) References Cited

U.S. PATENT DOCUMENTS

| | | | |
|---|---|---|---|
| 3,840,313 A | | 10/1974 | Grundmann et al. |
| 4,301,100 A | | 11/1981 | Farrell |
| 4,773,845 A | * | 9/1988 | Nagura et al. ............... 425/593 |
| 5,045,253 A | | 9/1991 | Kamiguchi et al. |
| 5,059,365 A | | 10/1991 | Hertzer et al. |
| 5,149,471 A | | 9/1992 | Catanzaro et al. |
| 5,279,778 A | * | 1/1994 | Taira et al. .................. 425/593 |
| 5,370,524 A | * | 12/1994 | Liang et al. ................ 425/593 |
| 5,800,750 A | * | 9/1998 | Laing et al. ................ 425/593 |
| 6,004,490 A | * | 12/1999 | Tsai ............................ 425/593 |

OTHER PUBLICATIONS

"Powerline 330 Specifications" product brochure available from Oct. 1998.

* cited by examiner

Primary Examiner—Jill L. Heitbrink
(74) Attorney, Agent, or Firm—John W. Gregg

(57) ABSTRACT

Method and apparatus for control of a toggle operated press to effectively set relative position between a fixed platen and a die height platen. The toggle crosshead is placed at a position required to achieve a desired press clamp force. The die height platen is advanced toward the fixed platen until minute motion of the toggle crosshead away from the fixed platen is detected whereat advance of the die height platen is ceased. In the relative position of the die height platen and fixed platen results in contact of the mold sections prior to the crosshead being placed at the required position, the crosshead is retracted a predetermined distance and then advanced to the required position. Desired die height setting is achieved without repeated iterations of a die height setting procedure.

20 Claims, 3 Drawing Sheets

METHOD AND APPARATUS FOR SETTING DIE HEIGHT

BACKGROUND OF THE INVENTION

I. Field of the Invention

This invention relates to presses, more particularly, to toggle operated presses commonly used in injection molding machines. The invention is directed particularly to setting relative locations of fixed and thrust or "die height" platens in such presses.

II. Description of Related Art

In injection molding machines, material to be molded is forced into cavities defined by mating mold sections. To permit relative motion of the mold sections, typically, at least one mold section is mounted to a movable platen driven by a press mechanism. In addition to moving the press member for productive use of the machine, the press mechanism, in combination with a press structure, provides the force required to overcome the separation force produced by injection of material into the mold cavities. A commonly used press mechanism for reciprocation of the movable platen is a "toggle" mechanism, a combination of pivoting links which produces translation and substantial mechanical advantage. In addition to such mechanisms, the press mechanism typically includes devices for setting the relative locations of the press mechanism and a fixed platen, to accommodate tooling elements (mold sections and mold "bases") having a combined thickness within a range determined by overall press size, such thickness referred to as "height" or "die height".

Although it would be possible to overcome mold separation forces by consistently imposing a mechanism maximum "clamping" force, the attainment of such forces requires maximum energy consumption and increases wear of machine components. Consequently, it is preferred that the "clamping" force be matched to the expected mold separation force. Hence, it is known to provide press mechanisms which permit setting of desired clamp forces while also permitting adjustment of die height. Examples of such mechanisms are shown and described in U.S. Pat. Nos. 5,059,253 and 5,149,471. As described in these patents, desired "clamping" force is produced by elastic stretch of strain rods induced by a toggle mechanism after mating mold sections are brought into contact. Typically, force at initial contact of mold sections is controlled, by, for example, torque limit control of the toggle mechanism drive motor during press closure. Once the mold sections have made contact, greater forces are permitted for further operation of the toggle mechanism to achieve the desired clamping force.

As described in the referenced patents, desired clamping force is achieved by precise setting of relative position between the press mechanism and a fixed platen on which a mating mold section is mounted. It is known, for example, to use iterative procedures requiring operation of the press mechanism and press mechanism positioning devices. As devices for positioning the press mechanism typically change position at low rates, such iterative procedures may require substantial time to complete position setting.

SUMMARY OF THE INVENTION

It is an object of the present invention to provide improved methods and apparatus for setting die height in toggle operated press mechanisms.

It is a further object of the present invention to provide a method for setting die height of a toggle operated press wherein the likelihood of repetition of setting steps is reduced.

It is a further object of the present invention to provide a method of setting die height of a toggle operated press wherein the press mechanism is operated to locate a toggle crosshead at a predetermined position required to achieve a desired clamping force.

Further objects and advantages of the invention shall be made apparent from the accompanying drawings and the following description thereof.

In accordance with the aforesaid objects the present invention provides a method for setting die height of a toggle operated press. The toggle is operated to position the toggle crosshead at a position where the mold sections will make contact and from which further extension of the toggle mechanism will generate the desired clamping force, this position is referred to as "required crosshead position" or "RCP". Thereafter, the entire press mechanism is advanced toward the fixed platen until minute motion of the toggle crosshead away from the fixed platen is detected. In the event the relative location of the press mechanism prevents initial positioning of the toggle crosshead to the RCP, the press mechanism is moved away from the fixed platen a predetermined distance and the press mechanism is again operated to position the toggle crosshead at the RCP.

DETAILED DESCRIPTION OF THE PREFERRED EMBODIMENT

Figure 1:
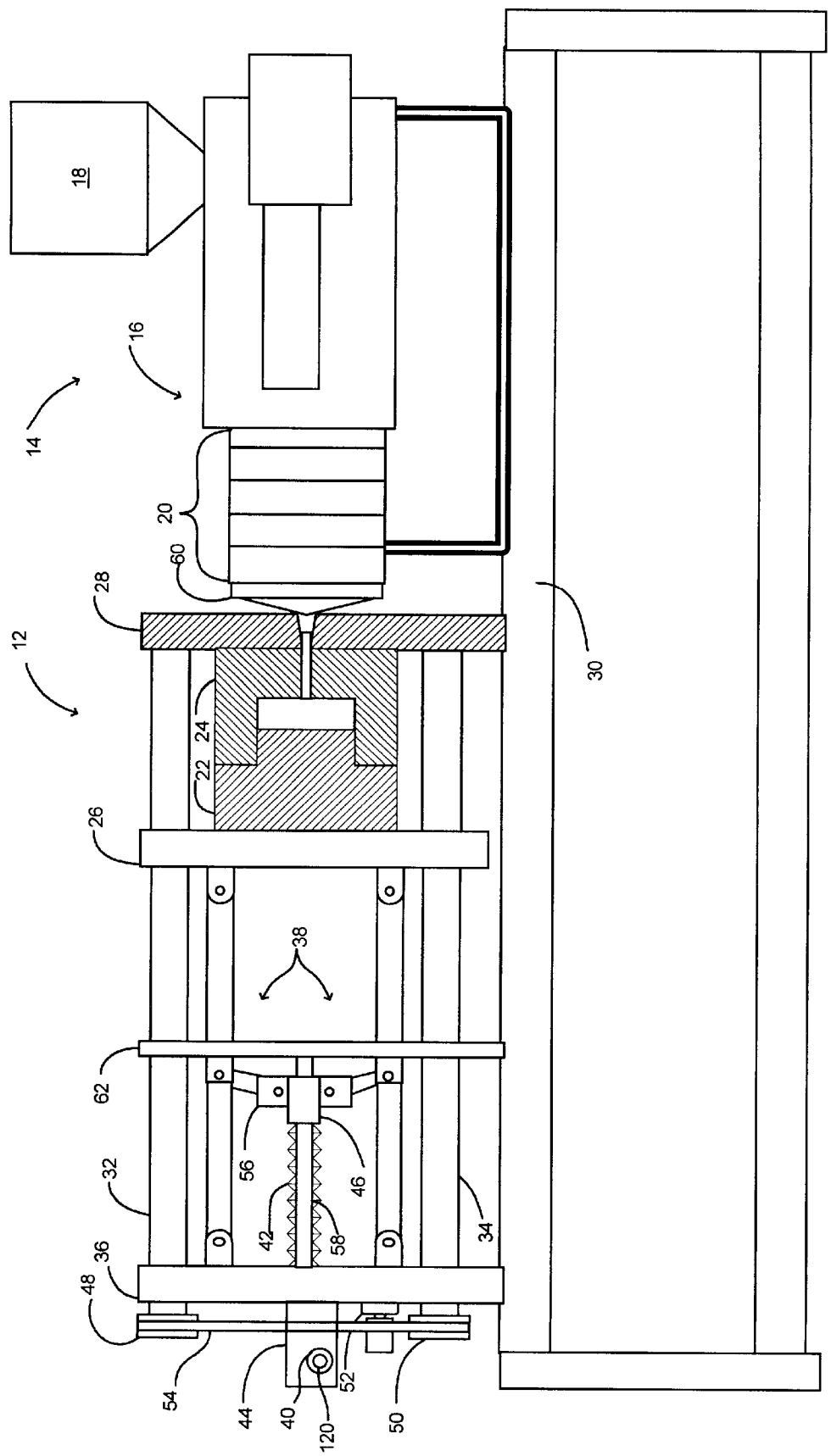
FIG. 1 is a schematic diagram of an injection molding machine with a toggle operated press.

Referring to FIG. 1, an injection molding machine 10 includes a clamp assembly 12 and an injection unit 14. Typical of plastic injection molding machines, raw material in the form of pellets and/or powders is introduced to an extruder 16 through hopper 18. Extruder 16 includes a barrel portion 60, typically surrounded by external heating elements 20, and an internal material working screw, not shown. As raw material is liquefied, i.e. plasticized, by a combination of heating and material working, the plasticized material advances toward the exit end of the extruder, displacing the interior screw away from clamp assembly 12. Once a sufficient volume of material has been plasticized, the working screw is advanced within barrel portion 60 to force material through the exit end of barrel portion 60 into a cavity defined by mating mold sections 22 and 24. Clamp assembly 12 holds mold sections 22 and 24 together during injection and thereafter until the injected material has sufficiently solidified to be removed without unacceptable deformation. Movable platen 26 is then retracted, separating mold section 22 from mold section 24 to permit release of the molded article.

Continuing with reference to FIG. 1, clamp assembly 12 comprises fixed platen 28, movable platen 26, thrust or "die height" platen 36 and toggle mechanism 38. Fixed platen 28 supports mold section 24 and is rigidly mounted to machine base 30. Strain rod pairs 32 and 34 are supported at opposite ends by fixed platen 28 and thrust or die height platen 36. Movable platen 26 is slidably supported on strain rod pairs 32 and 34 for reciprocation between "open" and "closed" positions, "closed" referring to the advanced position as shown in FIG. 1. A toggle link mechanism 38, interposed between movable platen 26 and thrust platen 36, is operated by a rack and pinion combination comprising a rack (not shown) and pinion (not shown) within drive case 44. The pinion is rotated by motor 40 to translate the rack horizontally toward and away from fixed platen 28. A rack extension (not shown) connects the rack with a toggle link crosshead 56. The rack extension is enclosed by bellows 42 to contain lubricant dislodged from the rack externally of drive case 44 and to prevent contaminants from entering drive case 44 at the opening through which the rack extension protrudes. Toggle link crosshead 56 includes guide sleeves, such as sleeve 46, surrounding guide rods, such as rod 58, supported between die height platen 36 and support plates, such as support plate 62. In response to reciprocation of the rack, toggle link mechanism 38 produces reciprocation of moveable platen 26 and provides sufficient mechanical advantage to convert torque at motor 40 to the desired clamping force. Toggle link mechanism 38 is preferably operable to a "lock-over" configuration, as shown in FIG. 1 wherein serial pivoting links between thrust platen 36 and movable platen 26 are longitudinally aligned. On opening, reciprocation of crosshead 56 pivots these links to reduce the effective length and draw movable platen 26 away from fixed platen 28.

Die height setting nut pairs 48 and 50 are threadably engaged with ends of strain rod pairs 32 and 34 outboard of thrust platen 36. Die height setting nut pairs 48 and 50 are rotated by motor 52 through a drive such as drive chain 54. Nut pairs 48 and 50 could as well be driven by, for example, a ring gear drive, or toothed belt drive. Rotation of nut pairs 48 and 50 positions the combination of die height platen 36, toggle link mechanism 38 and movable platen 26, that is, the press mechanism, along strain rod pairs 32 and 34.

As is conventional, motor 40 is preferably a servo-motor and includes or works in combination with a position measuring transducer 120 which produces electrical signals representing position of the motor armature. Also, as is well known for control of servo motors, other transducers may be used with motor 40 to measure, for example, armature angular velocity or to detect armature locations for motor current commutation. Further, as is conventional, motor 52 is not operated as a servo-motor, and no position transducer is fitted to motor 52 or the die height adjusting drive. In the configuration illustrated in FIG. 1, position transducer 120 may be an encoder for measuring angular position of the motor armature. As shown in FIG. 1, motor 40 is a rotating machine, wherein an armature and stator are arranged for rotation of one relative to the other and position transducer 120 measures the relative angular position. Were motor 40 a linear motor, position transducer 120 could as well measure linear position of a translating motor armature. Alternatively, position transducer 120 may measure linear displacement and be mechanically coupled to crosshead 56.

Figure 2:
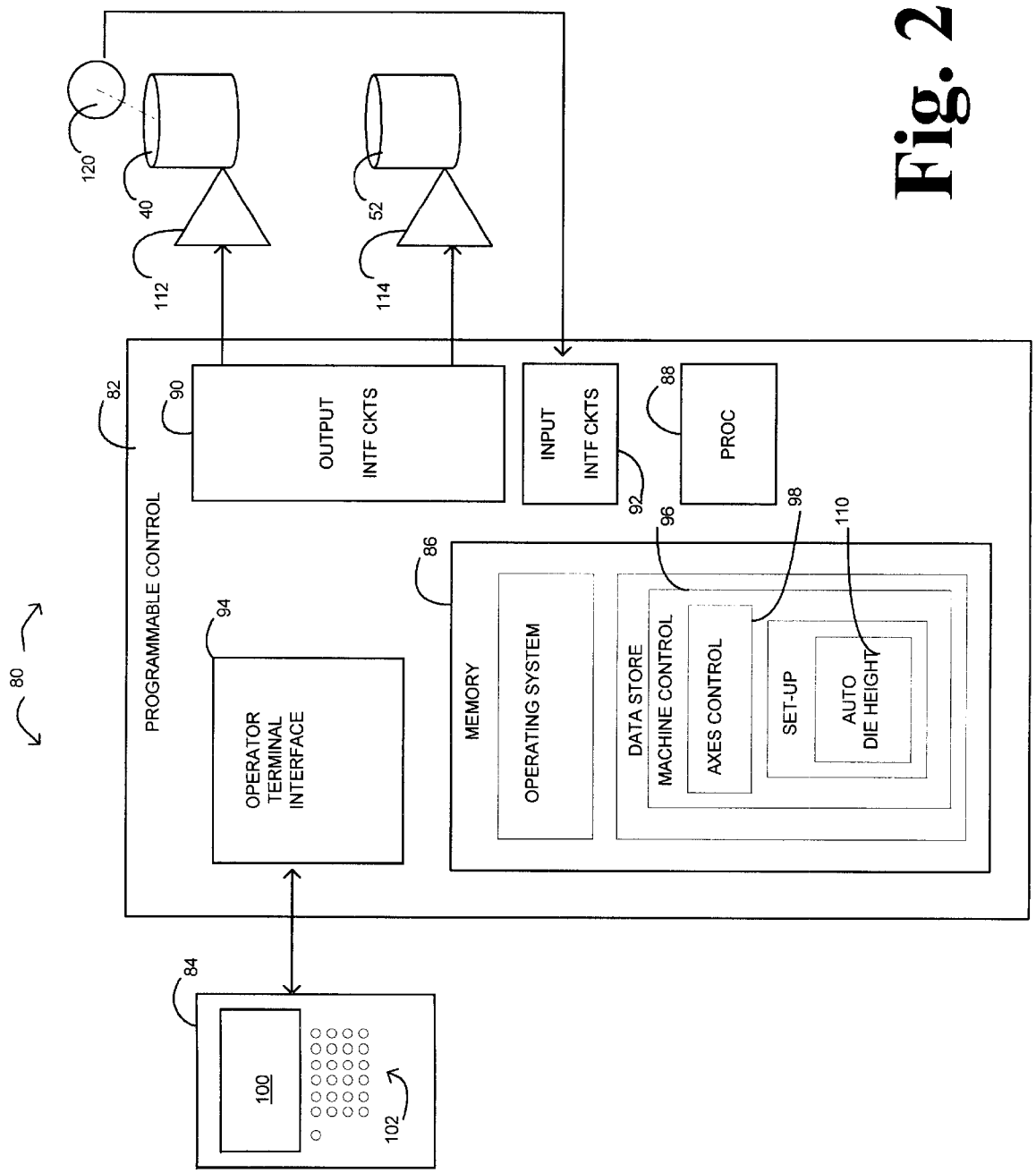
FIG. 2 is a block diagram of a control system for the injection molding machine of FIG. 1.

A control system for the injection molding machine shown in FIG. 1 shall be described with reference to FIG. 2. Control system 80 includes a programmable control 82, such as, for example, a programmable logic controller or personal computer based control system, and an operator terminal 84 including a display 100 and input devices 102 such as keys, push buttons, computer "mouse", and the like and data reading and recording devices such as magnetic tape drives, diskette drives, and magnetic strip or stripe card reading drives. Programmable control 82 includes operator terminal interface circuits 94, memory 86, one or more processors indicated by processor 88, output interface circuits 90, and input interface circuits 92. Operator terminal interface 94 includes circuits for controlling display of data on operator terminal 84 and for translating between signals used by processor 88 and signals used by input devices 102. Memory 86 may include non-volatile memory such as semiconductor read only memory (ROM), volatile memory such as semiconductor random access memory (RAM), and mass storage devices such as disk memory. Processor 88, typically, one or more digital processors, executes programs recorded in memory to process input signals, perform logical and arithmetic functions, and produce output signals to control the operation of machine devices. Input and output interface circuits 90 and 92 may include electrical and optical devices for translating between the digital electrical signals used by processor 88 and the digital and analogue electrical signals used by machine devices. Machine control 80 produces signals for controlling the operation of motors 40 and 52. Output signals defining, for example, position, velocity, and/or acceleration are applied to motor drive 112 to control electrical current delivered to motor 40 from a suitable power source such as a conventional three-phase alternating current source. Output signals defining direction of rotation are applied to motor relay 114 to control application to motor 52 of a suitable power source, such as for example, three-phase voltage. As is conventional, motor drive 112 uses signals produced by position transducer 120 in connection with the control of current delivered to motor 40. Conversely, motor drive 114 may include current limiting devices such as thermal overload devices or fuses to prevent excessive currents flowing through motor 52.

As is conventional, functions performed by programmable control 82 are controlled by operating system programs 94 which may be recorded in ROM or otherwise stored in memory 86. Operating system programs may be dedicated to particular programmable control hardware or may be commercially available operating systems for personal computers such as, for example, a WINDOWS operating system available from Microsoft Corp. Operating system programs 94 control the execution of machine control programs 96 by processor 88. Machine control programs perform logical and arithmetic functions to monitor and control the operation of machine devices. Typically, such programs permit at least two modes of operation of the machine: (i) an automatic mode for normal production; and (ii) a set-up or manual mode, for preparing the machine and machine devices for production and for setting parameter values used by the machine control programs in production of particular articles from particular material. While the automatic mode of operation will cause motion of machine members in accordance with values established by the user during machine set-up, the set-up mode permits manually controlled motion of machine members. Hence, routines for control of machine actuators, known as axes control routines, may be used to effect controlled motion in both automatic and manual or set-up modes of operation.

The present invention is concerned with a particular aspect of machine setup, that is, establishment of die-height so as to achieve a desired clamp force. The operator selects a set-up mode of operation via operator terminal 84. With set-up mode selected, the operator may invoke automated die height setting, causing execution of the die height setting programs 110 recorded in memory 86.

Figure 3:
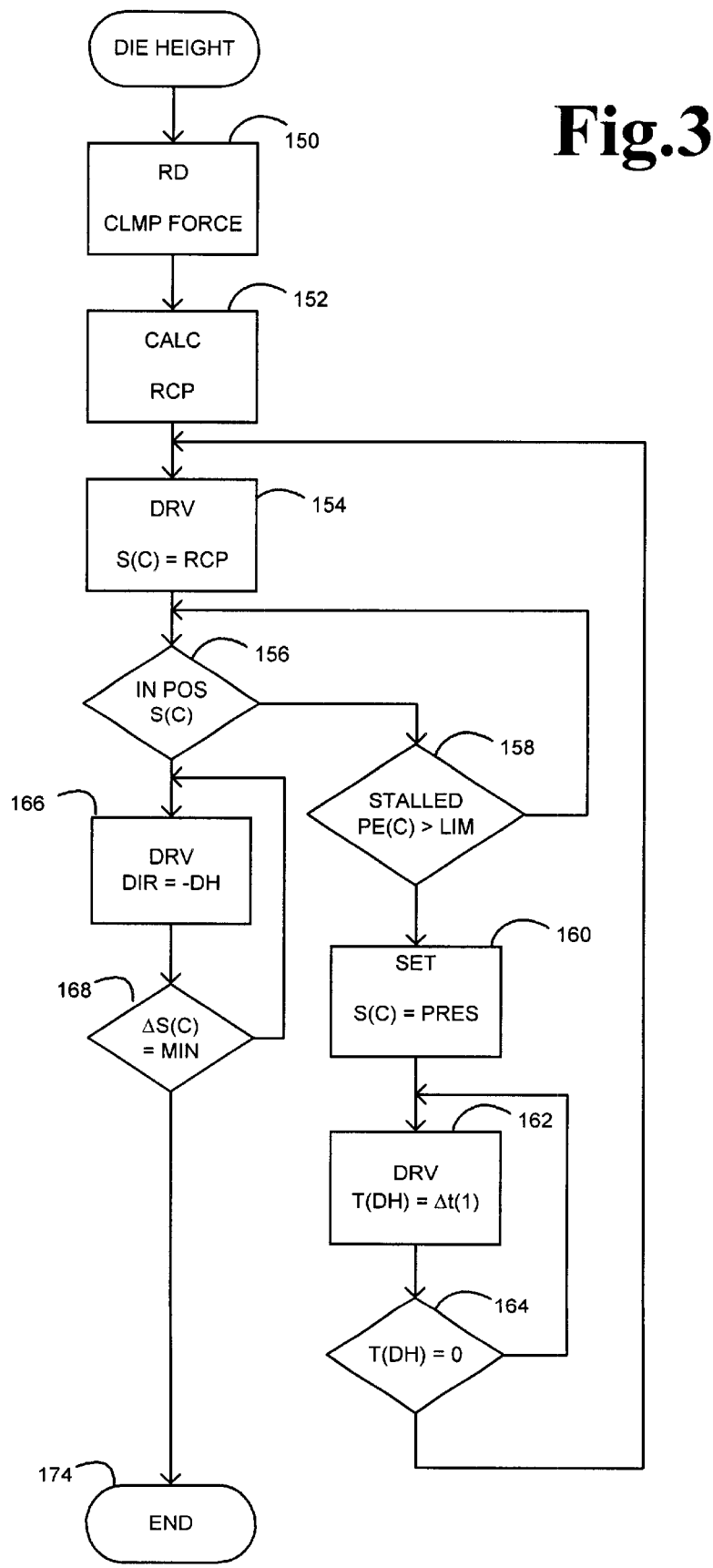
FIG. 3 is a flow chart of a procedure used by the control system of FIG. 1 to set die height of the injection molding machine press.

Description of the functions of die height setting programs 110 shall be made with reference to the flow chart of FIG. 3. At step 150, the required clamp force value entered by the operator is read from memory 86. At step 152 the position of toggle crosshead 56 required to produce the specified clamp force is calculated from the following relationship:

$$RCP = K_1 * CF + OFF_1 + K_2 * MPF + OFF_2 + K_3 * MH + OFF_3 \quad \text{Equation 1}$$

Where:
- CF=required clamp force
- MPF=mold protect force
- MH=actual mold height
- RCP=required crosshead position
- $K_1$=clamp force constant
- $K_2$=mold protect constant
- $K_3$=mold height constant
- $OFF_1$=clamp force offset
- $OFF_2$=mold protect offset
- $OFF_3$=mold height offset The first term of equation 1, "$K_1 * CF + OFF_1$" defines a nominal crosshead location according to the desired clamp force. The clamp force constant "$K_1$" and clamp force offset "$OFF_1$" are values determined from measurements made on machine 10 using blank mold elements of nominal thickness, referred to as "mold height". The clamp force constant "$K_1$" and clamp force offset "$OFF_1$" are determined from measurements of cross head position to produce clamp forces equal to the maximum clamp force and at least one reduced clamp force.

As the clamp closes, it is desired that initial contact of the mold elements occur with reduced force. Hence, common practice is to define a mold protect force to limit further advance of the moveable platen during clamp closure. It will be appreciated that crosshead position from which desired clamp force is generated varies as a function of the mold protect force, since the mold protect force arises from contact of the mold sections as the toggle is operated toward lock-over. Hence, equation 1 includes a term to account for mold protect force, that is "$K_2 * MPF + OFF_2$". In this term, the mold protect constant "$K_2$" and mold protect offset "$OFF_2$" are determined from measurements made on machine 10 wherein a selected clamp force is achieved with blank mold elements of nominal thickness. The mold protect constant "$K_2$" and mold protect offset "$OFF_2$" are determined from measurements of cross head position to achieve the selected clamp force for at least two values of mold protect force.

Equation 1 includes a mold height term "$K_3 * MH + OFF_3$" to account for actual mold element thickness which typically will differ significantly from the nominal mold thickness used to generate the constants and offsets associated with desired clamp force and mold protect force. In the mold height term, values for the mold height constant "$K_3$" and mold height offset "$OFF_3$" are determined by measurements made on machine 10 of cross head position to achieve a selected clamp force using blank mold elements equivalent to maximum and minimum mold heights.

At step 154, a command is generated to drive motor 40 to move crosshead 56 to the required clamp force position. Steps 156 and 158 represent monitoring of the progress of crosshead to the required clamp force position. Position of the crosshead is conveniently measured using position transducer 120, and arrival at the commanded position will result in generation of an "In Position" signal by the axes control routines 98 by comparison of measured position and commanded position. Occurrence of the "In Position" signal is detected at step 156. It will be recognized by those skilled in the art that, depending on the capabilities of motor drive 112, an "In Position" signal may be generated by motor drive 112 rather than by axes control routines 98. In any case, the "In Position" signal represents coincidence between measured position and commanded position within an acceptable tolerance.

In the event the crosshead is prevented from reaching the commanded position, for example, in the event mold sections 22 and 24 come into contact before the crosshead 56 has reached an expected mold contact location, motor 40 will "stall", that is, will cease to further advance crosshead 56. This condition will be reflected in cessation of change of position of crosshead 56 while a position error, that is, difference between the commanded position and measured position, continues to exist. This condition may be detected within axes control routines 98 as a velocity error, that is a difference between expected velocity and actual velocity as determined from the rate of change of position. Alternatively, this condition may be detected within motor drive 112 by, for example, motor current reaching a current limit value. Step 158 represents detection of occurrence of stalled motion of crosshead 56.

In the event step 158 detects that crosshead motion is stalled, commanded motion of crosshead 56 is terminated at step 160 where position command S(C) is set equal to the present crosshead position, eliminating position error. Thereafter, die height platen 36 is driven to be retracted away from fixed platen 28 a predetermined distance. As motor 52 effectively operates at constant velocity (within the tolerance of the applied power and allowing for inherent delays of acceleration and deceleration as the motor is energized and de-energized), motion through a predetermined distance can be accomplished by driving motor 52 in one direction for a predetermined period. Hence, at step 162, a drive command is generated to retract die height platen 36 for a preset period $\Delta t(1)$. Step 164 detects expiration of the retract period. The die height setting procedure continues at step 154 where a position command is generated to position crosshead 56 at the required crosshead position previously calculated. It will be appreciated that steps 154–164 define an iterative loop to automate positioning of crosshead 56 at the required crosshead position.

Once crosshead 56 has been successfully positioned at the required crosshead position, die height platen 36 is driven to advance to the point of contact of mold sections 22 and 24. At step 166, a command is generated to advance die height platen 36 toward fixed platen 28. On occurrence of contact of mold sections 22 and 24, crosshead 56 will be forced away from fixed platen 28 by the forces acting on toggle mechanism 38. Step 168 detects the occurrence of a minute change of position ($\Delta S(C)=MIN$) of cross head 56 away from fixed platen 28 as reflected in position measured by position transducer 120. Conveniently, the minute change of position is programmable to accommodate characteristics of the press mechanism established during commissioning of machine 10. The minute change of position must be more than any expected fluctuation of measured position attributable to signal conversion and "holding" torque of motor 40 and must be less than would translate to an error in desired clamp force. This completes setting of die height and execution of the die height setting procedure ends at terminal 174.

While the invention has been described with reference to a preferred embodiment, and while the preferred embodiment has illustrated and described with considerable detail, it is not the intention of the inventors that the invention be limited to the detail of the preferred embodiment. Rather, it is intended that the scope of the invention be defined by the appended claims and all equivalents thereto.

What is claimed is:

1. A method for setting relative position between a fixed platen and a die height platen of a toggle operated press mechanism, the toggle operated press mechanism including a crosshead reciprocable for opening and closing the press mechanism, the method comprising:
   a) determining a position of a toggle crosshead relative the die height platen required to produce a desired clamp force;
   b) positioning the toggle crosshead at the determined position;
   c) advancing the die height platen toward the fixed platen; and
   d) completing setting of relative position by ceasing advance of the die height platen in response to detecting a change of position of the crosshead away from the fixed platen.

2. The method of claim 1 wherein the step of determining the position of the toggle crosshead further comprises calculating a position according to the following relationship:

$$RCP=K_1*CF+OFF_1+K_2*MPF+OFF_2+K_3*MH+OFF_3$$

Where:
   CF=required clamp force
   MPF=mold protect force
   MH=actual mold height
   RCP=required crosshead position
   $K_1$=clamp force constant
   $K_2$=mold protect constant
   $K_3$=mold height constant
   $OFF_1$=clamp force offset
   $OFF_2$=mold protect offset
   $OFF_3$=mold height offset.

3. The method of claim 1 wherein the step of positioning the crosshead at the determined position further comprises:
   a) advancing the crosshead toward the fixed platen;
   b) ceasing advance of the crosshead in response to detecting no change of position of the crosshead prior to reaching the determined position;
   c) retracting the die height platen away from the fixed platen a predetermined distance;
   d) advancing the crosshead toward the fixed platen to the determined position.

4. The method of claim 1 wherein the step of advancing the die height platen toward the fixed platen further comprises monitoring position of the crosshead while advancing the die height platen.

5. The method of claim 4 wherein the step of ceasing advance of the die height platen further comprises detecting a minute change of position of the crosshead away from the fixed platen while monitoring crosshead position.

6. An apparatus for setting relative position between a fixed platen and a die height platen of a toggle operated press mechanism, the toggle operated press mechanism including a toggle crosshead reciprocable for opening and closing the press mechanism, the apparatus comprising:
   a) a first motor and motor drive for moving the toggle crosshead;
   b) a second motor for moving the die height platen;
   c) a position transducer for determining position of the toggle crosshead;
   d) a programmed controller for controlling the first motor and drive to place the toggle crosshead at a position within its range of reciprocation required to produce a desired clamp force and for subsequently controlling the second motor to advance the die height platen toward the fixed platen, the programmed controller completing setting relative position by controlling the second motor to cease advance of the die height platen in response to detection of a change of determined position of the crosshead away from the fixed platen.

7. The apparatus of claim 6 wherein the programmed controller further comprises a processor for determining a position of the toggle crosshead relative the die height platen required to produce a desired clamp force according to the following relationship:

$$RCP=K_1*CF+OFF_1+K_2*MPF+OFF_2+K_3*MH+OFF_3$$

Where:
   CF=required clamp force
   MPF=mold protect force
   MH=actual mold height
   RCP=required crosshead position
   $K_1$=clamp force constant
   $K_2$=mold protect constant
   $K_3$=mold height constant
   $OFF_1$=clamp force offset
   $OFF_2$=mold protect offset
   $OFF_3$=mold height offset.

8. The apparatus of claim 6 wherein the programmable controller further comprises axes control means for effecting position controlled motion of the first motor.

9. The apparatus of claim 6 wherein the first motor is a rotating machine and the position transducer measures first motor armature angular position from which position of the crosshead is determined.

10. The apparatus of claim 6 wherein the first motor is a linear motor and the position transducer measures first motor armature translational position from which position of the crosshead is determined.

11. The apparatus of claim 6 wherein the position transducer measures position of the crosshead.

12. The apparatus of claim 6 wherein the programmed controller executes a procedure to effect placement of the crosshead at the required position comprising commanding motion of the first motor to advance the crosshead toward the fixed platen, ceasing the commanded motion toward the fixed platen in response to detection that the first motor has stalled while such motion is commanded, commanding motion of the second motor to move the die height platen away from the fixed platen a predetermined distance, and commanding motion of the first motor toward the fixed platen to place the crosshead at the required position.

13. The apparatus of claim 12 wherein, in response to completion of placement of the crosshead at the required position, the procedure further comprises commanding motion of the second motor to advance the die height platen toward the fixed platen, monitoring the determined position of the crosshead during the commanded motion of the second motor, and ceasing the command for motion of the second motor in response to detecting a change of determined position of the crosshead away from the fixed platen.

14. The apparatus of claim 6 wherein the programmed controller comprises a personal computer based control system.

15. The apparatus of claim 14 wherein the programmed controller further comprises machine control programs for controlling the operation of the toggle operated press mechanism.

16. The apparatus of claim 15 wherein the machine control programs comprise axes control programs for effecting position controlled motion of the first motor.

17. The apparatus of claim 16 wherein the machine control programs provide a set-up mode of operation of the toggle operated press, and the set-up mode of operation includes a programmed procedure to effect the relative positioning of the fixed platen and die height platen.

18. The apparatus of claim 17 wherein the programmed procedure determines the crosshead required position from the following relationship:

$$RCP = K_1 * CF + OFF_1 + K_2 * MPF + OFF_2 + K_3 * MH + OFF_3$$

Where:
- CF=required clamp force
- MPF=mold protect force
- MH=actual mold height
- RCP=required crosshead position
- $K_1$=clamp force constant
- $K_2$=mold protect constant
- $K_3$=mold height constant
- $OFF_1$=clamp force offset
- $OFF_2$=mold protect offset
- $OFF_3$=mold height offset.

19. The apparatus of claim 18 wherein execution of the programmed procedure effects placement of the crosshead at the required position by commanding motion of the first motor to advance the crosshead toward the fixed platen, ceasing the commanded motion toward the fixed platen in response to detection that the first motor has stalled while such motion is commanded, commanding motion of the second motor to move the die height platen away from the fixed platen a predetermined distance, and commanding motion of the first motor toward the fixed platen to place the crosshead at the required position.

20. The apparatus of claim 19 wherein in response to completion of placement of the crosshead at the required position, execution of the programmed procedure further effects commanding motion of the second motor to advance the die height platen toward the fixed platen, monitoring the determined position of the crosshead during the commanded motion of the second motor, and ceasing the command for motion of the second motor in response to detecting a change of determined position of the crosshead away from the fixed platen.

* * * * *